United States Patent
Markert et al.

(10) Patent No.: US 11,041,641 B2
(45) Date of Patent: Jun. 22, 2021

(54) CONDITIONED AIR BLOWER SYSTEM FOR LOADING DOCK TRAILER

(71) Applicant: DL Manufacturing, North Syracuse, NY (US)

(72) Inventors: Joseph Markert, East Syracuse, NY (US); Donald L. Metz, Kirkville, NY (US); Kyle Berean, Canastota, NY (US)

(73) Assignee: DL Manufacturing, Inc., North Syracuse, NY (US)

( * ) Notice: Subject to any disclaimer, the term of this patent is extended or adjusted under 35 U.S.C. 154(b) by 290 days.

(21) Appl. No.: 15/169,467

(22) Filed: May 31, 2016

(65) Prior Publication Data
US 2017/0343222 A1 Nov. 30, 2017

(51) Int. Cl.
| F24F 11/00 | (2018.01) |
| F24F 1/0011 | (2019.01) |
| F24F 1/0022 | (2019.01) |
| B60H 1/00 | (2006.01) |
| F24F 11/76 | (2018.01) |

(52) U.S. Cl.
CPC ........ *F24F 1/0011* (2013.01); *B60H 1/00014* (2013.01); *B60H 1/00471* (2013.01); *F24F 1/0022* (2013.01); *F24F 11/76* (2018.01)

(58) Field of Classification Search
CPC ... B60H 1/00257; F24F 1/0011; F24F 1/0022; F24F 11/74; F24F 2110/00; F24F 2110/10
See application file for complete search history.

(56) References Cited

U.S. PATENT DOCUMENTS

| 2,634,589 A | * | 4/1953 | Wilson | B61D 27/0027 |
| | | | | 62/237 |
| 4,182,134 A | * | 1/1980 | Viegas | F25D 19/003 |
| | | | | 62/298 |
| 4,973,016 A | * | 11/1990 | Hertenstein | F21V 21/108 |
| | | | | 248/282.1 |
| 4,978,896 A | * | 12/1990 | Shah | G05D 7/0676 |
| | | | | 236/DIG. 9 |
| 5,931,012 A | * | 8/1999 | Robertson | B60H 1/00257 |
| | | | | 62/237 |

(Continued)

*Primary Examiner* — Jonathan Bradford
(74) *Attorney, Agent, or Firm* — Barry F. Manna

(57) ABSTRACT

A conditioned air blower system for ventilating a trailer interior includes a centrifugal blower and a heat exchange unit. The centrifugal blower includes a blower housing, an inlet portion configured to direct air into the blower housing, and a discharge portion configured to direct air from the blower housing into the trailer interior. The heat exchange unit includes an air inlet portion, heat exchange elements, and a conditioned air exit portion coupled to the inlet portion of the centrifugal blower. The heat exchange unit conditions ambient air introduced at the air inlet portion from a first temperature to a second temperature by heat exchange relationship with the heat exchange elements. The conditioned air blower system may include a controller operatively associated with the centrifugal blower. The controller monitors a condition related to the centrifugal blower, and regulates the supply of temperature-conditioned air in response to the condition.

17 Claims, 6 Drawing Sheets

(56) References Cited

U.S. PATENT DOCUMENTS

| | | | | |
|---|---|---|---|---|
| 5,987,908 | A * | 11/1999 | Wetzel | F24F 1/027 62/259.1 |
| 8,702,481 | B1 * | 4/2014 | Wilbourn | B60J 9/04 296/19 |
| 2002/0045420 | A1 * | 4/2002 | Taillon | B60H 1/00014 454/119 |
| 2004/0216469 | A1 * | 11/2004 | Viegas | B60H 1/00257 62/50.2 |
| 2005/0260943 | A1 * | 11/2005 | Snyder | B60H 1/00014 454/118 |
| 2008/0124203 | A1 * | 5/2008 | McDonald | B65G 69/005 414/401 |
| 2012/0078420 | A1 * | 3/2012 | Jensen | G05B 11/16 700/275 |
| 2013/0101451 | A1 * | 4/2013 | Dickinson | F04D 25/0613 417/423.7 |
| 2014/0360221 | A1 * | 12/2014 | Kyle | F25B 39/02 62/426 |
| 2016/0084268 | A1 * | 3/2016 | Cocks | H02P 23/00 415/1 |

\* cited by examiner

CONDITIONED AIR BLOWER SYSTEM FOR LOADING DOCK TRAILER

CROSS-REFERENCE TO RELATED APPLICATIONS

Reference is made to and this application claims priority from and the benefit of U.S. Provisional Application Ser. No. 62/167,700, filed May 28, 2015, entitled "LAMINAR FLOW AIR MOVER SYSTEM HAVING TEMPERATURE-CONDITIONED INLET AIR", which application is incorporated herein in its entirety by reference.

BACKGROUND OF THE INVENTION

This disclosure relates generally to a conditioned air blower and, more specifically, to a centrifugal blower having temperature-conditioned air provided at the blower inlet.

A noted problem within the loading dock industry concerns ventilation inside a trailer when workers load and unload the contents of the trailer. Standard loading dock fans provide high volume airflow, but since the airflow is at a low velocity, and randomly directed, the airflow does not travel much more than half the trailer length before it recirculates back into the fan's intake. As a result, the air in the back of the trailer (e.g., towards the cab) becomes stagnant and hot. One recent improvement to the standard loading dock fan is a laminar flow centrifugal blower having a necked-down discharge tube with an elbow that allows the discharge air to be directed into the trailer. The combination of laminar flow and the gradual decrease in diameter of the discharge tube provides a high velocity discharge stream that is able to efficiently ventilate the entire interior of the trailer.

Although a laminar flow centrifugal blower can be useful and may be advantageous for certain applications, it does suffer from drawbacks. One drawback is that the high velocity discharge air stream is the same ambient temperature as the loading dock bay area, which may be much warmer or cooler than the rest of the facility. In some loading dock bay areas, the overhead doors are left in the open position to accommodate frequent trailer traffic at the docks. In such cases, a flexible PVC strip curtain may be installed to separate the loading bay area from the remainder of the shop floor. In time, then, the temperature of the loading bay area approaches the outdoor temperature. In other loading dock applications, the doors may be closed more frequently but the bay area may have insufficient HVAC service to keep the temperature and humidity of the bay area at a comfortable level. Thus, if the loading dock bay area is uncomfortably warm, or uncomfortably cold, the ventilation air in the trailer will be the same uncomfortable temperature.

BRIEF SUMMARY OF THE INVENTION

In one aspect of the invention, a conditioned air blower system for ventilating a trailer interior includes a centrifugal blower and a heat exchange unit. The centrifugal blower includes a blower housing, a blower fan supported within the blower housing, a motor configured to drive the blower fan, an inlet portion configured to direct air into the blower housing, and a discharge portion configured to direct air from the blower housing into the trailer interior. The heat exchange unit includes an air inlet portion, heat exchange elements, and a conditioned air exit portion coupled to the inlet portion of the centrifugal blower. The heat exchange unit conditions ambient air introduced at the air inlet portion from a first temperature to a second temperature by heat exchange relationship with the heat exchange elements.

In one example, the heat exchange unit includes an evaporator unit, and the heat exchange elements include an evaporator coil as part of a closed-loop refrigerant line.

In another example, the conditioned air blower system further includes a condenser unit coupled to the closed-loop refrigerant line.

In another aspect of the invention, the conditioned air blower system further includes a controller operatively associated with the centrifugal blower. The controller monitors a condition related to the centrifugal blower, and regulates the supply of temperature-conditioned air in response to the condition.

BRIEF DESCRIPTION OF THE SEVERAL VIEWS OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views. For example, differing embodiments of like elements may be assigned 100-series, 200-series, and so on.

DETAILED DESCRIPTION OF THE INVENTION

As used herein, the term "trailer" means a vehicle with an enclosed cargo area, and may include, but is not limited to, tractor trailer trucks, refrigerated trucks, box trucks, delivery trucks, and vans.

Figure 1:
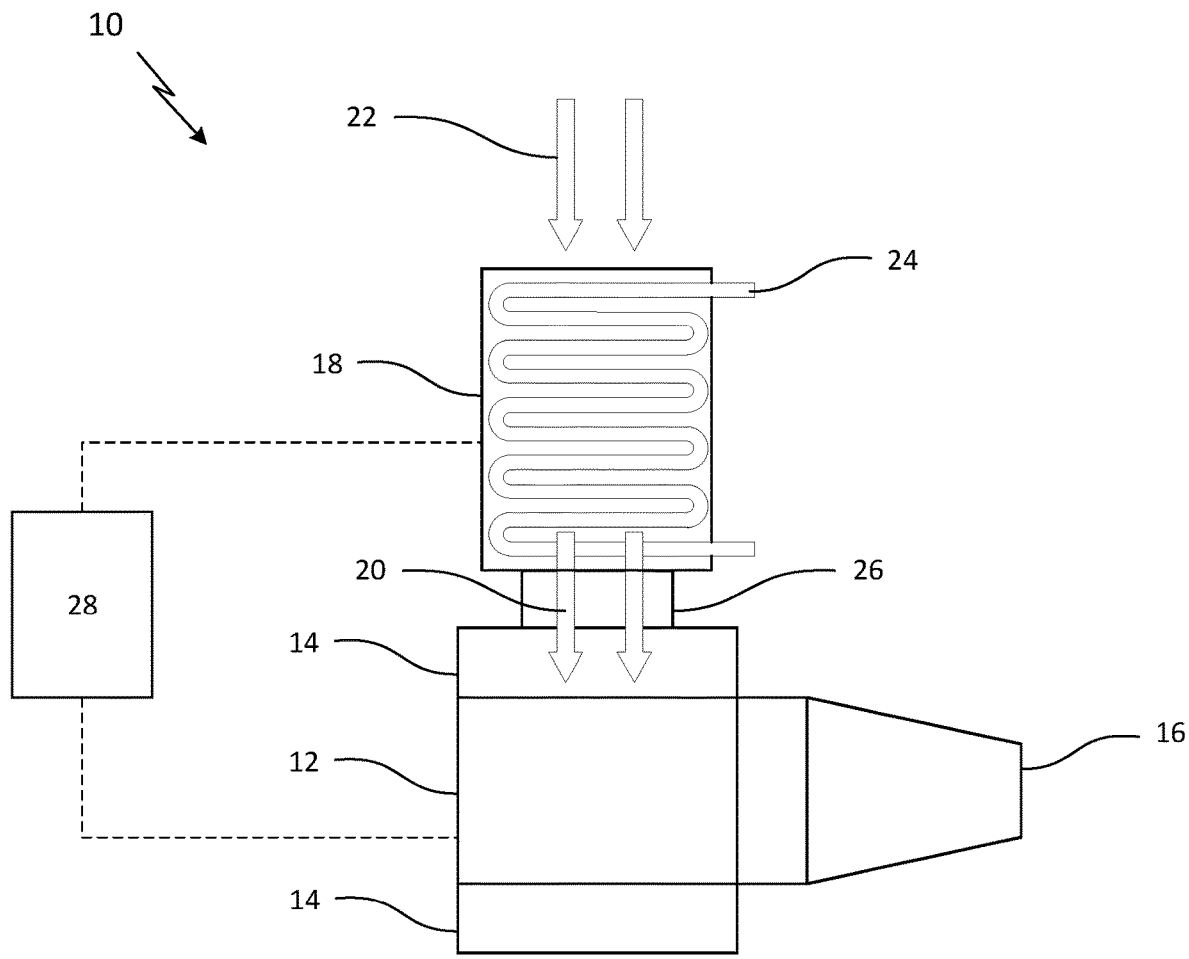
FIG. 1 depicts a block schematic diagram of a conditioned air blower system in accordance with another embodiment of the invention.

FIG. 1 illustrates a schematic diagram of an exemplary embodiment of a conditioned air blower system 10 that may be used to provide a more comfortable flow of air to a trailer interior. The conditioned air blower system 10 includes a centrifugal blower 12 having at least one inlet portion 14 to direct air into the blower, and a discharge portion 16 to direct air from the blower 12 into the trailer interior. The conditioned air blower system 10 further includes a heat exchange unit 18 to supply temperature-conditioned air 20 to the inlet portion 14 of the centrifugal blower 12. The term 'temperature-conditioned air' means air that has been heated or cooled relative to the temperature of the ambient air 22 in the loading dock area, including air that has had its moisture content adjusted relative to that surrounding the loading dock area. The heat exchange unit 18 includes heat exchange elements 24 to condition a supply of ambient air 22 by raising or lowering the temperature of the air. In some embodiments, the conditioned air blower system 10 includes a supply duct 26 connecting the output of the heat exchange unit 18 with the inlet portion 14 of the blower 12.

The conditioned air blower system 10 may further include a controller 28 operatively associated with the centrifugal blower 12 and the heat exchange unit 18. The controller can be configured to monitor an input condition or sensor related to the centrifugal blower 12 and, in response to the condition, regulate the supply of temperature-conditioned air 20 to the blower 12.

Figure 2:
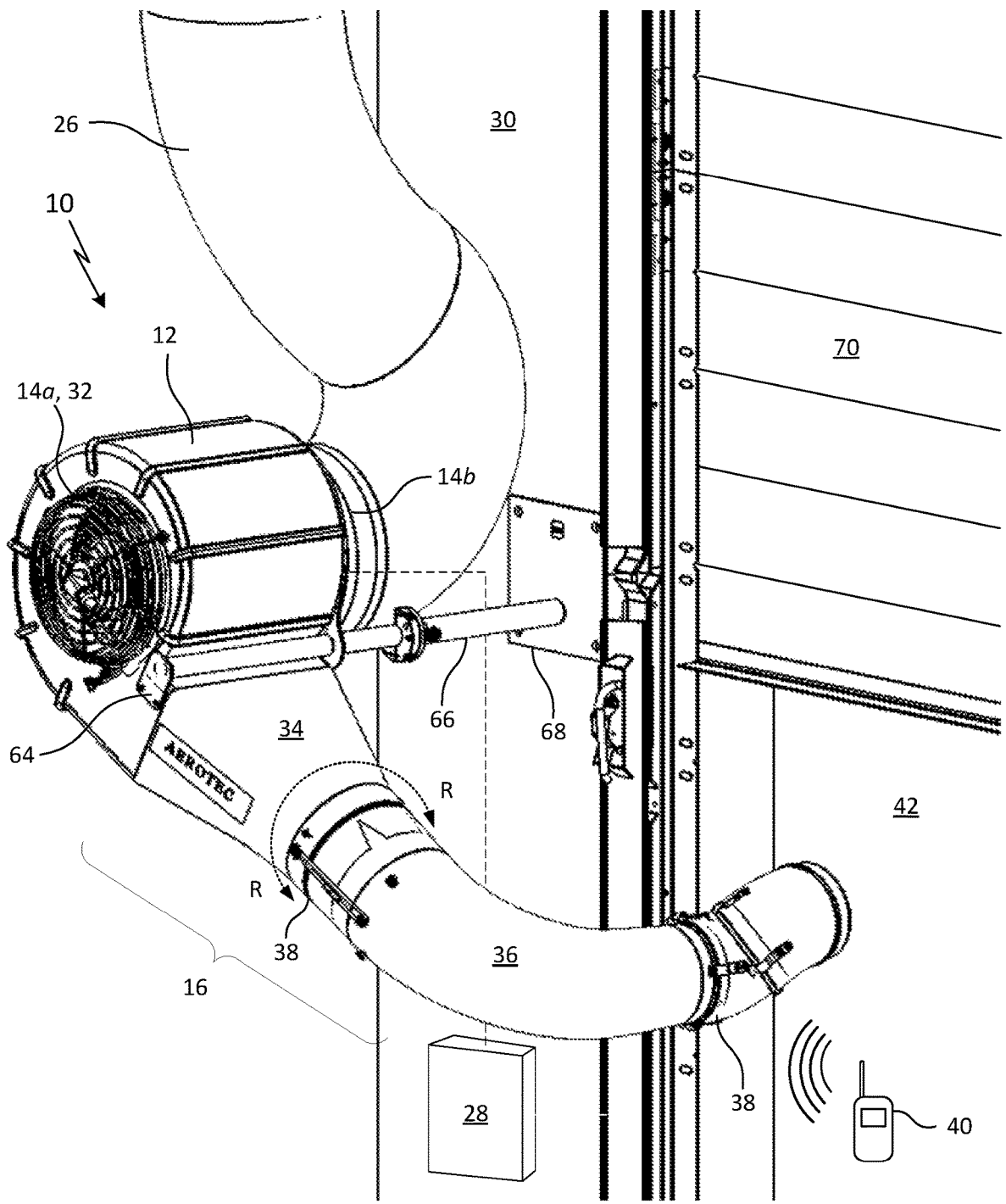
FIG. 2 depicts a perspective view of a conditioned air blower system in accordance with one embodiment of the invention.

FIG. 2 illustrates a portion of a conditioned air blower system 10 in accordance with one embodiment of the invention. The centrifugal blower 12 includes two inlet portions which, as defined herein, generally refers to the hardware required to direct air into the blower 12. The particular configuration of centrifugal blower 12 depicted in FIG. 2 draws air in from both sides of the blower 12. Thus, the centrifugal blower 12 includes a first inlet portion 14a that draws in ambient air from the loading dock bay area, and a second inlet portion 14b that interfaces with a supply duct 26 from a heat exchange unit 18 (not shown). As shown, the centrifugal blower 12 may be mounted a distance away from the loading dock inside wall 30 to provide sufficient clearance for the supply duct 26 to be mounted behind the blower.

As noted, the centrifugal blower 12 may have two inlet portions 14a, 14b on opposing sides of the blower housing. In the illustrated embodiment, the supply duct 26 with temperature-conditioned air 20 is mounted to inlet portion 14b. In some environments it may be desirable to partially block or completely block the opposing inlet portion (e.g., 14a) to maximize the temperature-conditioned air 20 entering the trailer. In some embodiments, then, a damper system 32 may be utilized to regulate the amount or degree or percentage of ambient air supplied to the centrifugal blower 12. The damper system 32 (not illustrated) may be positioned within the inlet portion 14a of the centrifugal blower 12. In one example, the damper system 32 may be a circular plate that can be manually rotated to block all or a portion of the ambient air entering inlet portion 14a.

The blower 12 may further include a discharge portion 16 configured to direct air from the blower into the trailer interior 42. The blower 12 may be mounted above and/or to the side of the overhead door frame to minimize obstruction with the trailer interior 42 and decrease the likelihood of being hit by a forklift. The discharge portion 16 may include a straight discharge adapter 34 configured to transition the discharge from a rectangular cross section to a smaller circular cross section, and may further include an elbow conduit 36 to turn the air flow and direct it into the trailer interior 42. The exit of the elbow conduit 36 may be a smaller diameter than the entrance to further backpressure the centrifugal blower 12 for better performance. The discharge portion 16 and/or the elbow conduit 36 may further include a break-away pivoting portion 38 that permits the elbow to rotate about its central axis (indicated by arrows R-R), enabling a range of airflow adjustment into the trailer and also enabling the elbow conduit 36 to pivot completely out of the overhead door opening when not in use. The break-away pivoting portion 38 may also include a break-away feature that allows the elbow conduit 36 to snap free from the discharge adapter 34 in the event a forklift hits the elbow. The break-away feature may also permit easy re-installation.

In operation, the controller 28 may be operatively associated with the centrifugal blower 12 and the heat exchange unit 18 (FIG. 1). The controller may be configured to monitor a condition related to the centrifugal blower 12 and regulate the supply of temperature-conditioned air 20 in response to the condition. The controller 28 may also operate the damper system 32 (e.g., activate and position the damper). In one example, the controller 28 could monitor an environmental condition such as the temperature inside the trailer. A wireless temperature sensor 40 may be placed in the trailer interior 42 at the front trailer wall. The output data of the temperature sensor 40 may be evaluated by a processor within the controller 28. In one example, the temperature data may be compared to a threshold limit value stored in a lookup table. Based upon the reading, the controller 28 may execute instructions, such as powering on the blower 12 and the heat exchange unit 18 if the temperature reading is greater than the threshold value (e.g., 80° F.). In a similar manner, the controller 28 may power off the blower 12 and heat exchange unit 18 if the temperature reading subsequently drops below the threshold value.

In another example, the temperature sensor 40 may be located in the discharge portion 16 of the centrifugal blower 12. The controller 28 may be configured to regulate a parameter associated with the centrifugal blower 12, such as air discharge temperature or air flow. For example, the air discharge temperature data may be compared to a desired range of values stored in a lookup table. Based upon the temperature data, the controller 28 may execute instructions to power on the heat exchange unit 18 and increase or decrease the speed of the blower 12 to maintain the air discharge temperature within the desired range.

In another embodiment of the invention, the controller may be configured to monitor a simple on-off switch. The conditioned air blower system 10 may be controlled by a switch that is in a 'normally off' position. In the event a user desires temperature-conditioned air 20 into the trailer, the user may manually select the 'on' position of the switch. In response, the controller 28 may turn on power to the centrifugal blower 12.

In another example of its operation, the centrifugal blower 12 may be activated without use of a controller. For example, the centrifugal blower 12 may be manually powered on using a simple on-off switch, or by plugging its power cord to a standard 120 volts a/c (VAC) outlet. The damper system 32, if present, may also be manually operated without a controller.

In another embodiment of the invention, the controller 28 may be configured to monitor an operating condition of the centrifugal blower 12. In one example, the controller 28 may monitor a current sensor coupled to a power cord on the motor of the centrifugal blower 12. The current sensor may give an indication of the power level at which the centrifugal blower 12 is operating. The controller 28 may command more or less power to the centrifugal blower 12 in response to, for example, a temperature sensor positioned in or near the discharge portion 16 of the blower, or within the trailer interior 42. In another example, the controller 28 may monitor a shaft speed sensor coupled to the motor of the blower.

The output data from the temperature sensor 40 may also be utilized as input for a feedback control loop to position the damper plate 32. For example, the damper could be closed down to minimize airflow through inlet portion 14a of the centrifugal blower 12, thereby maximizing the cooling capability of the conditioned air blower system 10. A low amperage servo motor could operate the damper system 32 in response to commands from the controller 28.

Figure 3:
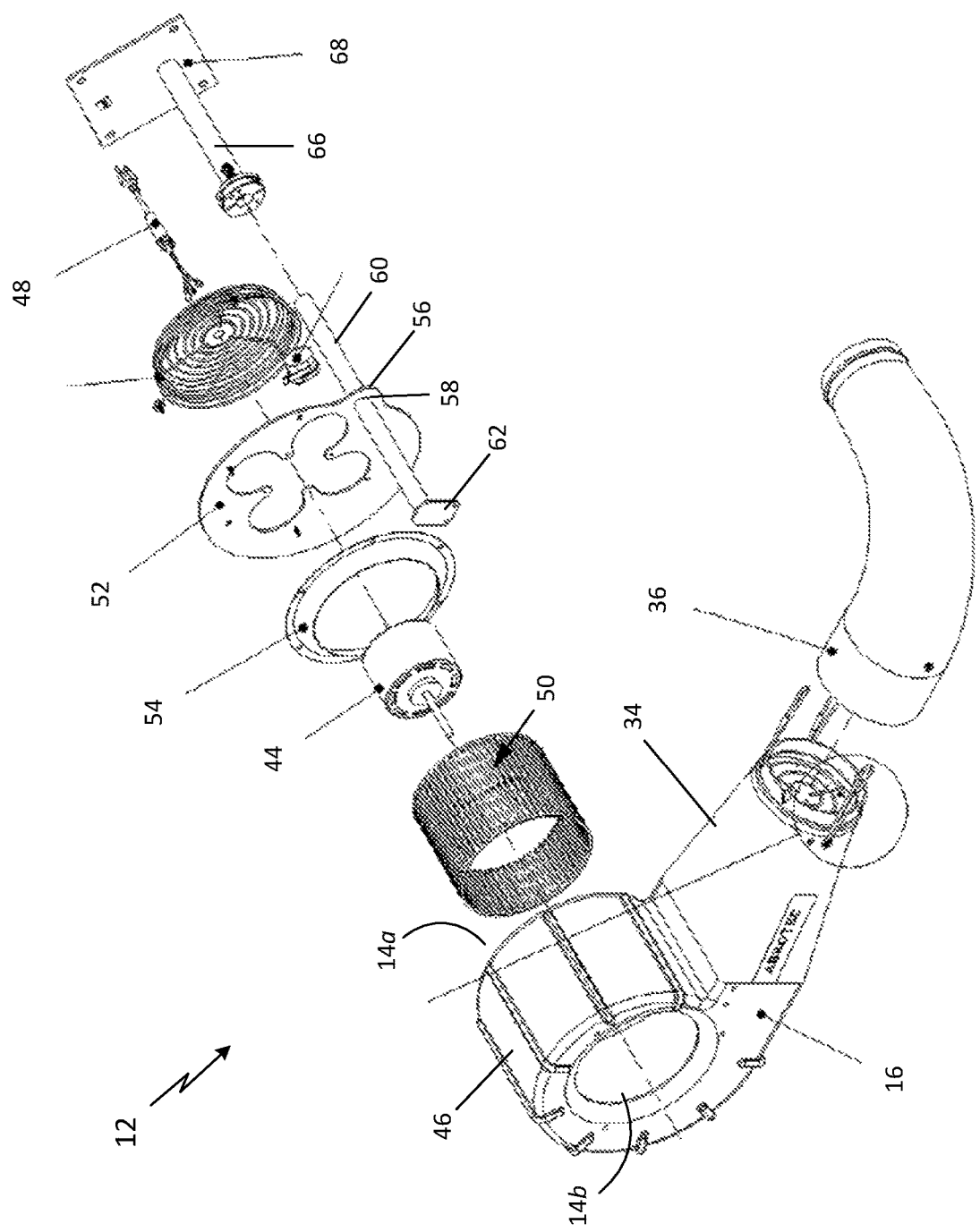
FIG. 3 depicts an exploded perspective view of a centrifugal blower shown in FIG. 1.

The centrifugal blower 12, shown in greater detail in FIG. 3, may include an internal motor 44 secured within a blower housing 46. The motor 44 may be powered by a 120 VAC supply, provided through a power cord 48. The driveshaft of the motor 44 turns a blower fan 50, known within the industry as a squirrel cage. In operation, air is drawn in from the sides of the blower housing 46, or inlet portions 14a, 14b, is then turned 90 degrees, accelerates due to the centrifugal force as it flows over the fan blades 50, and then exits the blower housing 46. The discharge air is further accelerated as it passes through the necked-down discharge adapter 34, then accelerated further as it passes through the necked-down elbow conduit 36. Upon discharge, the air has sufficient velocity to flow down the length of the trailer, bounce off the front trailer wall, and circulate back through the middle and opposite side of the trailer, thereby creating a ventilated environment.

The centrifugal blower 12 may further include a mounting assembly to properly position the blower over the door frame of the loading dock. In one embodiment, the mounting assembly includes a bracket plate 52 fastened to an air inlet ring 54, which is in turn fastened to the blower housing 46. The bracket plate 52 includes a protrusion 56 or 'ear' along its periphery. The protrusion 56 defines an aperture 58 configured to accommodate a mounting bar 60 in sliding engagement. A first end of the mounting bar 60 includes a blower housing mounting plate 62 which is secured to the centrifugal blower housing 46 adjacent the outlet opening thereof by means of screws or rivets 64 (FIG. 2). The opposite end of the mounting bar 60 telescopically engages a larger-diameter mounting tube 66. The end of the mounting tube 66 opposite the telescoping engagement includes a mounting plate 68, which may be secured to the wall 30 of the loading dock, adjacent an overhead door, by any suitable means such as screws (FIG. 2). As can be appreciated with reference to FIG. 2, the mounting hardware allows the blower 12 to extend towards and away from the wall 30, which may be beneficial in accommodating the connection to the supply duct 26, or an externally mounted motor.

In another embodiment of the invention, the centrifugal blower 12 may have only one inlet portion 14. For example, referring to FIG. 2, the inlet portion 14b may be replaced by an externally mounted motor, such that no air enters from that side of the blower 12. Or, in another example, there is no inlet on that side of the blower 12. In such an arrangement, the sole inlet portion 14 would receive the temperature-conditioned air 20 from the heat exchange unit 18. In one example, the supply duct 26 could be configured to separate from the inlet portion 14 by latches or the like when the temperature-conditioned air 20 is not needed.

The heat exchange unit 18 may be selected from any suitable configuration that fits the space, availability, and requirements. For example, the heat exchange unit 18 may be part of a non-ducted air conditioning system, such as the evaporative heat exchanger in a residential split or mini-split system. Split and mini-split systems have an outdoor compressor/condenser, and an indoor evaporator or air-handling unit. A conduit, which houses the power cable, refrigerant tubing 24, suction tubing, and a condensate drain, links the outdoor and indoor units. The temperature-conditioned air 20 output from the air handling unit may be routed to the inlet portion 14 of the centrifugal blower 12.

In another example, the heat exchange unit 18 may be part of a ducted HVAC system, such as direct expansion (DX) or chilled water system in a central plant. A ducted system may also include a packaged system, such as floor standing air cooled or water cooled air conditioner, or an air cooled ductable split system. In the ducted systems, a portion of the temperature-conditioned air 20 from the air handling unit can be routed to the inlet portion 14 of the centrifugal blower 12.

Figure 4:
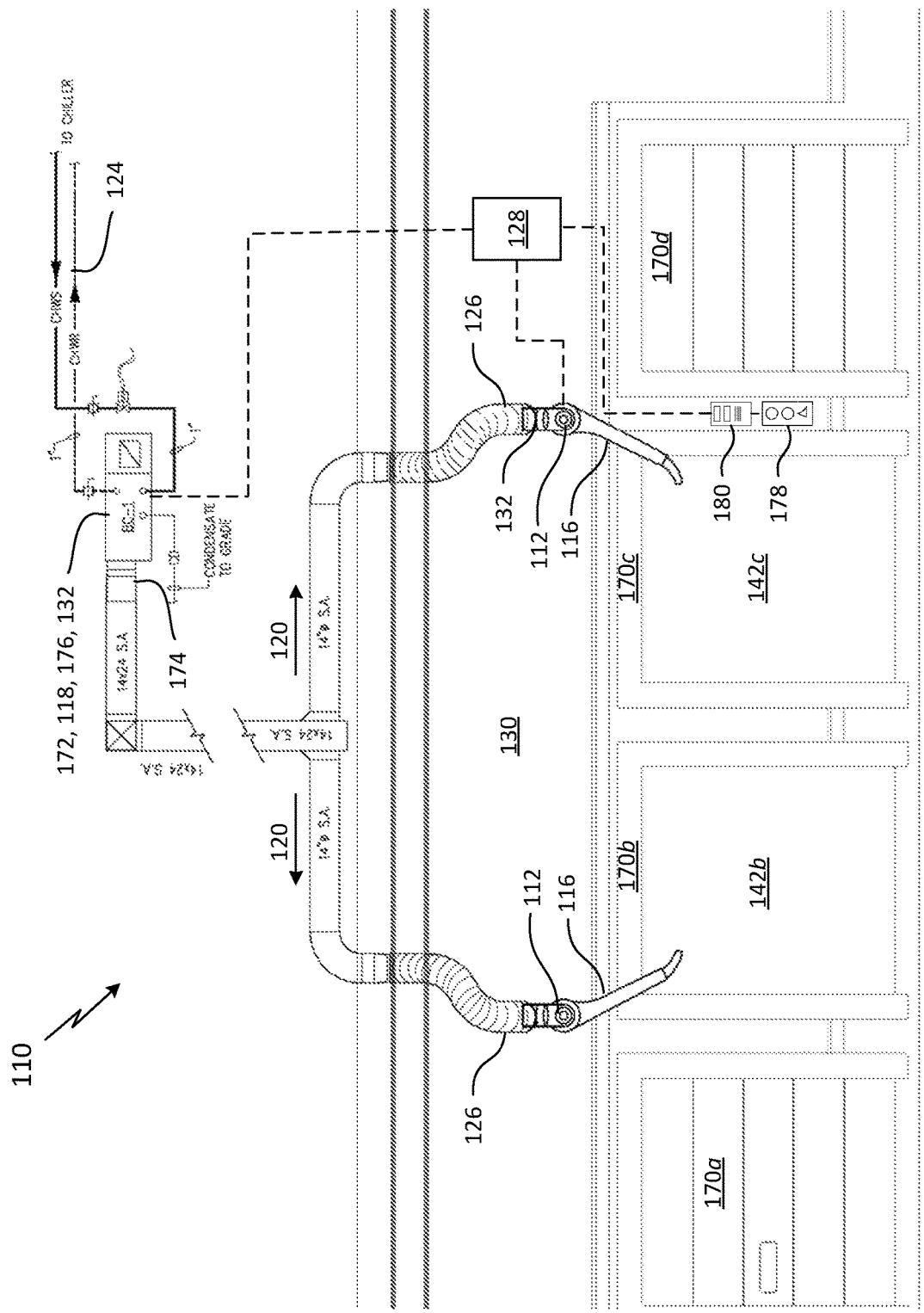
FIG. 4 depicts a plan view of a conditioned air blower system with a block schematic diagram in accordance with one embodiment of the invention.

Turning now to FIG. 4, wherein like numerals are used to indicate like parts from FIGS. 1-3, shown is another embodiment of a conditioned air blower system 110 along with a schematic diagram of a heat exchange unit 118 that provides temperature-conditioned air 120 to multiple blowers 112. The conditioned air blower system 110 is illustrated as seen from inside a loading dock bay area, looking out through the overhead doors 170. Doors 170a and 170d are closed, and doors 170b and 170c are open. Truck trailers may be backed up to the open doors 170b and 170c, such that trailer interiors 142b, 142c are shown ready for load or unloading operations. As can be seen with reference to FIG. 4, the centrifugal blowers 112 are mounted above and off to the side of the overhead doors 170, so only a small portion of the blower discharge 116 occupies the door opening.

In the illustrated embodiment, the heat exchange elements 124 of the heat exchange unit 118 are contained in an air handling unit 172 of a building's heating/ventilation/air conditioning (HVAC) system. As noted above, the air handling unit 172 supplies temperature-conditioned air 120 to the inlet portion of the blower housing via the supply duct 126. The air handling unit 172 may include a secondary blower 174 to move the temperature-conditioned air 120 through the ductwork 126.

The air handling unit 172 may also include components to heat the temperature-conditioned air 120 in cold weather, such as a humidifier 176 coupled to the heat exchange unit 118 to increase the moisture content of the temperature-conditioned air 120, heaters, or a hot water coil.

As noted above, a controller 128 is operatively associated with the centrifugal blower 112 and the heat exchange unit 118. The controller 128 is configured to monitor a condition related to the centrifugal blower 112 and regulate the supply of temperature-conditioned air 120 in response to the condition. In one embodiment, the controller 128 regulates the supply of temperature-conditioned air 120 by executing instructions to operate the secondary blower 174 in the air handling unit 172. The controller 128 may interface with or may comprise a controller operating a building's automation and control network, such as the BACnet communications protocol.

In another embodiment of the invention, the conditioned air blower system 110 may include a damper system 132 configured to regulate the amount or degree or percentage of temperature-conditioned air 120 supplied to the centrifugal blower 112. The damper system 132 may be positioned within the inlet portion 114 of the centrifugal blower 112, or may be accommodated within the air handling unit 172. The damper system 132 may be activated and positioned by the controller 128. In one example, the controller 128 could monitor a condition such as a temperature sensor placed in the trailer interior 142. Based upon demand, the controller 128 could execute instructions, such as a control loop, the maintain a balance point with the HVAC system. A low amperage servo motor could operate the damper system 132 in response to commands from the controller 128.

In another embodiment of the invention, the conditioned air blower system 110 may be operatively associated with a dock safety sensor system, such as the Smart Chock™ brand sensor system sold by DL Manufacturing, Syracuse, N.Y. Briefly, the dock safety sensor system is a trailer restraint system that secures the trailer while communicating with drivers and loading dock workers to ensure a safe and productive work environment. The dock safety sensor system includes a chock (not shown), an outside-mounted light box 178 (shown in dashed lines because it is located on the other side of the dock wall 130), and an inside-mounted control panel 180 with light box.

In operation, in a first step, as a driver backs up to a closed overhead door 170, the outside light box 178 illuminates green, indicating it is safe to proceed. Concurrently, the control panel 180 illuminates a red light, indicating the trailer is not chocked and it is unsafe to open the overhead door 170. In a second step, when the trailer is parked and chocked, a sensor in the chock relays the condition to the inside control panel 180, which illuminates a chock indicator light on the outside light box 178. Concurrently, the red light turns off and a green light illuminates on the inside control panel 180, indicating the trailer is chocked and it is safe to open the overhead door 170. In a third step, a photovoltaic sensor detects when the door is opened, relays the condition to the inside control panel 180, and a flashing red light is illuminated on the outside light box 178, indicating to the truck driver that loading operations are in progress and it is unsafe to remove the chock. The green light remains illuminated on the inside control panel 180. In a fourth step, when loading or unloading operations are complete and the overhead door 170 is closed, the flashing red light is turned off on the outside light box 178, indicating it is now safe to remove the chock. In a fifth step, after the driver removes the chock, the sensor in the chock relays the condition to the inside control panel 180, which turns off the chock indicator light on the outside light box 178. Concurrently, the green light turns off and the red light illuminates on the inside control panel 180, indicating the trailer is no longer chocked and it may be unsafe to open the overhead door 170.

In one embodiment of the invention, the inside control panel 180 can interlock and control operation of the centrifugal blower 112. For example, at step three above, when the sensor detects the overhead door 170 is open and the condition is relayed to the inside control panel 180, the controller 128 may send instructions to initiate operation of the centrifugal blower 112. The instructions may take the form of a simple on/off command, or in other examples, may initiate a logic sequence stored in the memory of the controller 128 to determine if blower operation is warranted. In another example, the instructions may control operation of the secondary blower 174 in the air handling unit 172, or the damper system 132.

Figure 5:
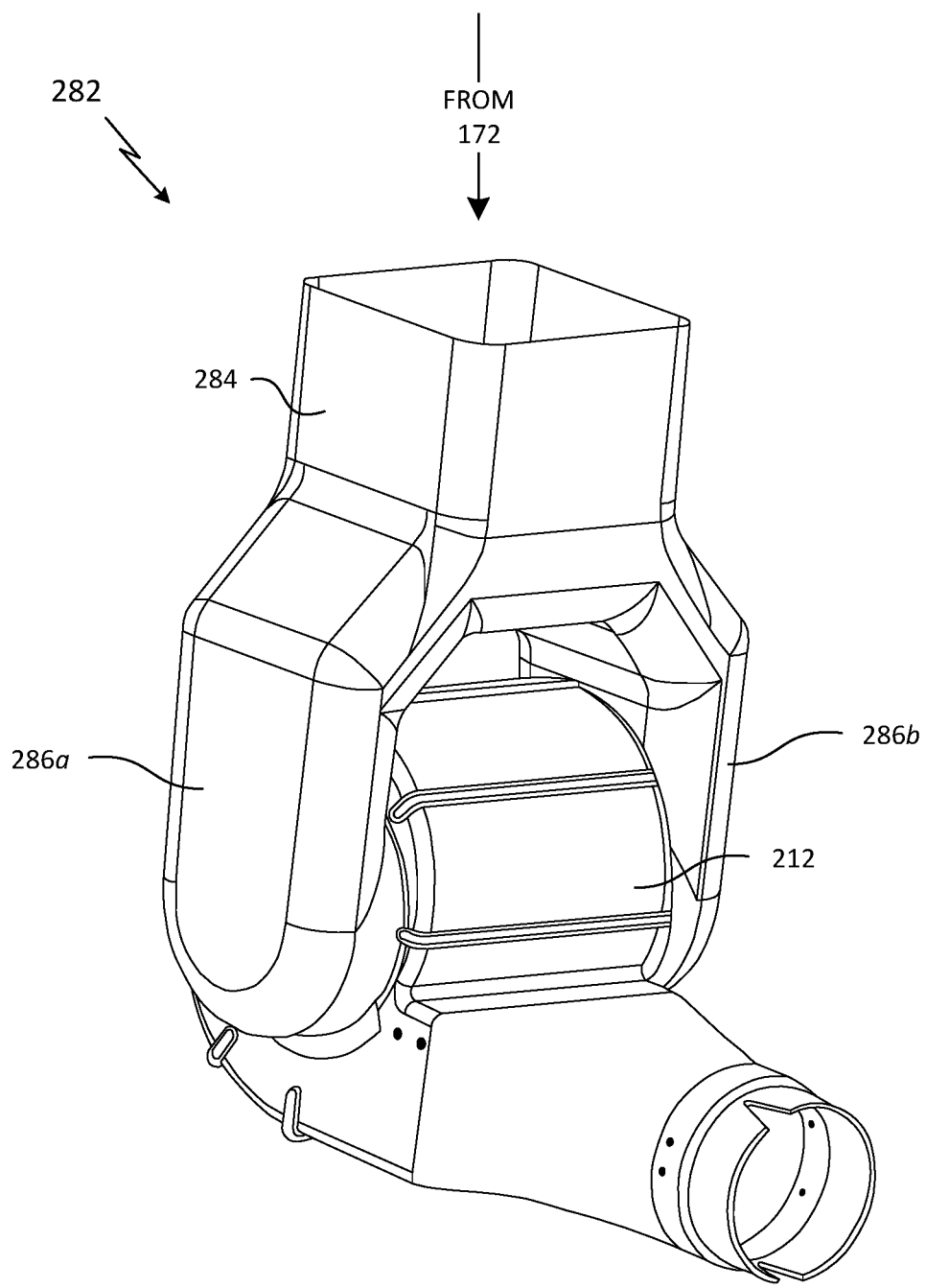
FIG. 5 depicts a perspective view of an adapter cuff in accordance with one embodiment of the invention.

Turning now to FIG. 5, in another embodiment of the invention, an inlet portion of a conditioned air blower system may include an adapter cuff 282 to better distribute the air flow over the inlet, or to provide a functional inlet flow distribution in limited space. The adapter cuff 282 includes a first end 284 to mate with a supply duct from an air handling unit, such as supply duct 126 and air handling unit 172 shown in FIG. 4, and a cuff region 286 to modify the inlet flow geometry. In the illustrated embodiment, the cuff region 286 includes symmetric cuff components 286*a* and 286*b*. Typical centrifugal blowers have uneven flow distribution over the inlet face, or from one side to the other, and the adapter cuff 282 can be used to redistribute the internal flow to provide more uniform entry into the blower. The adapter cuff 282 can also provide a low-profile entry path into the centrifugal blower 212. In one embodiment, the profile may be approximately one-half the width of the supply duct. In other examples, the profile may be between one-third and three-fourths the width of the supply duct.

Figure 6:
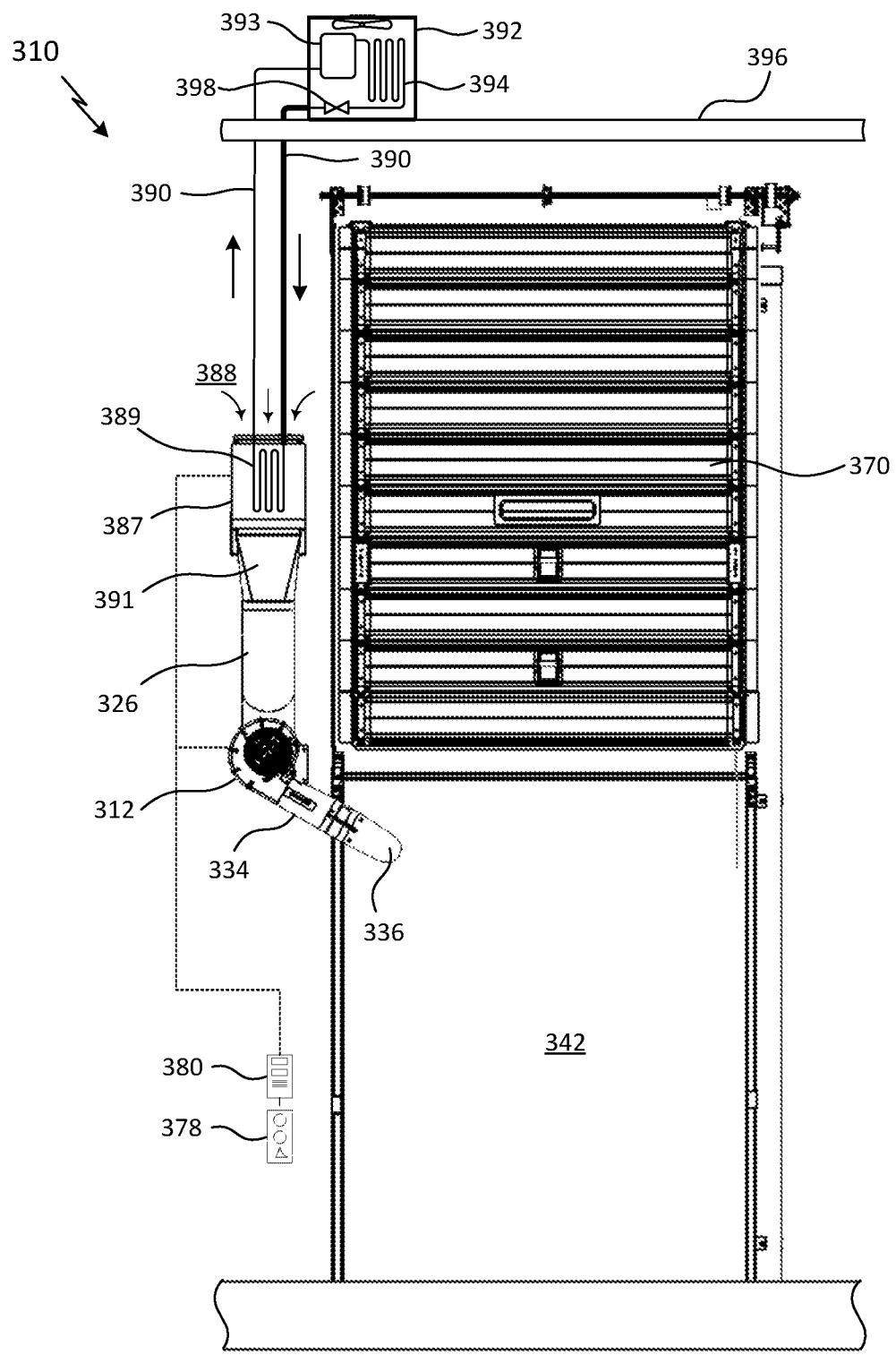
FIG. 6 depicts a plan view of the conditioned air blower system shown in FIG. 2.

FIG. 6 depicts a plan view of a conditioned air blower system 310 according to yet another embodiment of the invention. In this embodiment, the components utilized to supply temperature-conditioned air to the centrifugal blower 312 are stand-alone units that do not tie into the building's existing HVAC system. As a result, installation of the conditioned air blower system 310 is less complicated, less labor intensive, and reduces capital cost.

The conditioned air blower system 310 may include many of the components as depicted in FIG. 2, such as the centrifugal blower 312, including the discharge adapter 334 and elbow conduit 336. The conditioned air blower system 310 further includes a heat exchange unit, embodied as an evaporator unit 387, such as that found in a residential split air conditioning unit. The evaporator unit 387 includes an ambient air inlet portion 388, an evaporator coil 389 as part of a closed-loop refrigerant line 390, and a conditioned air exit portion 391, which is connected to the inlet portion of the blower 312 via supply duct 326.

The conditioned air blower system 310 may further include a condenser unit 392, such as that found in a residential split air conditioning unit. The condenser unit 392 may include a refrigerant compressor 393, a refrigerant condenser coil 394 as part of the closed-loop refrigerant line 390, and heat-rejection fins (not illustrated) to remove heat from the circulating refrigerant. The condenser unit 392 may be mounted on a support frame 396 suspended from the ceiling. The support frame 396 may be positioned well above the overhead door 370 to provide adequate clearance for the door's movement.

In operation, cold refrigerant is pumped through the evaporator coil 389 within the evaporator unit 387. The centrifugal blower 312 draws ambient air through the air inlet portion 388, across the evaporator coil 389 where the air is chilled, through the supply duct 326, and into the inlet of the centrifugal blower 312. The chilled air is expelled out the elbow conduit 336 and into the trailer interior 342.

As the ambient air is drawn across the evaporator coil 389, the refrigerant in the coil absorbs heat from the air. As the refrigerant absorbs heat, it evaporates into a low-pressure gas, which enters the compressor 393. The compressor 393 increases the pressure and temperature of the refrigerant gas, which then moves through the condenser coil 394. As the refrigerant passes through the condenser coil 394, heat is removed and the gas condenses back into a liquid. The liquid refrigerant flows to an expansion valve 398, which regulates how much refrigerant is supplied to the evaporator unit 387. The cold refrigerant then flows out the condenser unit 392 back to the evaporator unit 387, and the cooling cycle starts over again.

As used herein, an element or function recited in the singular and proceeded with the word "a" or "an" should be understood as not excluding plural said elements or functions, unless such exclusion is explicitly recited. Furthermore, references to "one embodiment" should not be interpreted as excluding the existence of additional embodiments that also incorporate the recited features.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A facility-based conditioned air blower system for ventilating a trailer interior, comprising:
   a centrifugal blower, comprising:
   a blower housing;
   a blower fan supported within the blower housing;
   a motor configured to drive the blower fan;
   a first inlet portion comprising a first opening on a side of the blower housing, the first inlet portion configured to direct temperature-conditioned air into the blower housing;
   a second inlet portion comprising a second opening on a different side of the blower housing, the second inlet portion configured to direct ambient, unconditioned air into the blower housing; and
   a discharge portion comprising an opening on the blower housing, the discharge portion configured to direct a mixture of ambient air and temperature-conditioned air from the blower housing into the trailer interior;
   and
   a heat exchange unit comprising an ambient air inlet portion, heat exchange elements, and a conditioned air exit portion coupled to the first inlet portion of the centrifugal blower, the heat exchange unit configured to condition ambient air introduced at the air inlet portion from a first temperature to a second temperature by heat exchange relationship with the heat exchange elements,
   wherein at least a portion of the heat exchange unit is mounted to a loading dock facility structure positioned remotely from the trailer interior so as to avoid creating an obstruction to the trailer interior.

2. The conditioned air blower system according to claim 1, wherein the second temperature is lower than the first temperature.

3. The conditioned air blower system according to claim 1, further comprising a supply duct coupled at a first end to the conditioned air exit portion of the heat exchange unit and coupled at a second end to the first inlet portion of the centrifugal blower.

4. The conditioned air blower system according to claim 1, wherein the heat exchange unit comprises an evaporator unit, and the heat exchange elements comprise an evaporator coil as part of a closed-loop refrigerant line.

5. The conditioned air blower system according to claim 4, further comprising a condenser unit coupled to the closed-loop refrigerant line, the condenser unit comprising a refrigerant compressor coupled to the evaporator coil and configured to increase the pressure and temperature of a refrigerant gas flowing out of the evaporator coil, and further comprising a condenser coil coupled to an exit of the refrigerant compressor, the condenser coil configured to remove heat from the refrigerant gas such that the refrigerant gas condenses back into a liquid.

6. The conditioned air blower system according to claim 1, further comprising a controller operatively associated with the centrifugal blower, the controller configured to monitor a parameter related to the centrifugal blower and, in response to monitoring the parameter, regulate the conditioned air flowing to the trailer interior.

7. The conditioned air blower system according to claim 6, wherein the controller is configured to monitor a sensor.

8. The conditioned air blower system according to claim 7, wherein the sensor is a temperature sensor.

9. The conditioned air blower system according to claim 8, wherein the temperature sensor is positioned within the discharge portion of the centrifugal blower.

10. The conditioned air blower system according to claim 8, wherein the temperature sensor is positioned within the trailer interior.

11. The conditioned air blower system according to claim 6, wherein the controller is configured to monitor an operating condition of the centrifugal blower.

12. The conditioned air blower system according to claim 6, wherein the controller is configured to monitor a switch.

13. The conditioned air blower system according to claim 12, wherein the switch is a manually operated on/off switch to initiate or terminate the supply of temperature-conditioned air.

14. The conditioned air blower system according to claim 1, further including a damper system coupled to one of the first inlet portion and the second inlet portion of the centrifugal blower, the damper system configured to regulate an amount of temperature-conditioned air supplied to the centrifugal blower.

15. The conditioned air blower system according to claim 14, wherein the damper system is activated and positioned by a controller.

16. The conditioned air blower system according to claim 15, wherein the controller monitors a current sensor coupled to a power cord on the motor of the centrifugal blower.

17. The conditioned air blower system according to claim 15, wherein the controller monitors a shaft speed sensor coupled to the motor.

* * * * *